United States Patent Office 3,847,843
Patented Nov. 12, 1974

3,847,843
THERMOSTABILIZERS
Franz-Josef Dany, Erftstadt Lechenich, Joachim Wortmann, Hurth, Joachim Kandler, Erftstadt Lechenich, and Jürgen Laubner, Erftstadt Liblar, Germany, assignors to Knapsack Aktiengesellschaft, Knapsack, near Cologne, Germany
No Drawing. Filed Jan. 4, 1973, Ser. No. 320,880
Claims priority, application Germany, Jan. 7, 1972, P 22 00 750.7
Int. Cl. C08g 22/44, 51/58
U.S. Cl. 260—2.5 BB                                5 Claims

ABSTRACT OF THE DISCLOSURE

Thermostabilizers stabilizing flame-retardant, phosphorus and halogen-containing addends which are used in the production of polyurethane foam plastics.

The stabilizers are more particularly comprised of substituted or unsubstituted aliphatic hydrocarbons having from 4 to 20 carbon atoms and at least one reactive —C—C— double bond in the molecule. The substituents are selected from hydroxyl, carboalkoxy or further neutral groups.

---

The present invention relates to thermostabilizers stabilizing flame-retardant, phosphorus and halogen-containing addends, which are used in the production of polyurethane foam plastics, and to a stabilizing process.

Cross-linked polyurethanes, especially those which have a cellular structure—these are briefly termed polyurethane foam plastics hereinafter—have gained particular interest for the most various uses. They are readily combustible, however, and this is very disadvantageous for a plurality of uses. The legislation in numerous countries therefore provides for these foam plastics to be rendered fireproof for industrial use, for example in constructional, automotive or electrical engineering, in the aircraft industries or in shipbuilding.

It has already been reported that polyurethane foam plastics can be rendered fireproof by incorporating fireproofing agents therewith. Substances containing phosphorus and halogen atoms, particularly chlorine or bromine atoms as the active elements in the molecule, are more particularly used because of their high efficiency and good processibility. It is possible for the fireproofing agents to be incorporated with the polyurethane batch, as true addends or reactive materials, which undergo chemical reaction with one or more of the components forming the polyurethanes. The fireproofing agent may be added to the batch prior to foaming, or may be introduced thereinto together with one or more of the individual batch components.

The additive fireproofing agents for polyurethanes include, for example, halogenated phosphoric acid esters, such as tris-(β-chloroethyl)-phosphate or tris-(2,3-dibromopropyl)-phosphate, and the reactive fireproofing agents include halogen and phosphorus-containing hydroxylic and polyhydroxylic compounds, in which the phosphorus is bound in a manner similar to a phosphate, phosphonate or phosphine. Such fireproofing agents have been disclosed, for example in U.S. Pat. 3,159,605 and 3,321,555, in German Pat. 1,208,485 and in Belgian Pat. 770,375. Typical of reactive fireproofing agents having hydroxylic groups therein is the fact that they additionally undergo reaction with the isocyanate component in the polyurethane batch, which accompanies the customary reaction of the starting materials with one another in the polyurethane batch. This latter reaction is known to be catalyzed by tertiary amines and/or organometal compounds, preferably tin(II) compounds, the foaming of the resulting polyurethanes being effected with the use of foam-inducing means, such as trichlorofluoromethane and/or water, in the reaction mixture.

The fireproofing agents having phosphorus and halogen therein have generally been found to produce a good flameproofing effect in polyurethane foam plastics. Their use is, however, greatly influenced by the extent to which they affect the initial physical properties of the polyurethane foam plastics that are treated therewith. A critical handicap of these fireproofing agents with regard to the fireproofing of foamed blocks having a volume substantially between 0.1 and 1 cubic meter resides in the fact that relatively large proportions of fireproofing agents are necessary to achieve this. Together with the heat that is liberated upon the foaming and cross-linking reactions and accumulates in the blocks, the fireproofing agents initiate an undesirable side reaction. As a result, the interior of a foamed polyurethane block is burned or at least subjected to undesirable coloration. The side-reaction is presumably initiated by partial thermal decomposition of the phosphorus and halogen-containing fireproofing agents. The use of the fireproofing agents in proportions substantially between 5 and 10 weight percent, based on the weight of the foam, has been found to initiate the appearance of these burning and coloration phenomena in the so-called core. These, however, are the proportions of fireproofing agent which are normally necessary for satisfactorily flameproofing a material and rendering it "self-extinguishing" (ASTM D1692–68T).

We have now unexpectedly discovered that it is possible by the use of minor proportions of certain compounds in the polyurethane batch to stabilize the fireproofing agent having phosphorus and halogen therein and to avoid undesirable burning or coloration in the interior of a foamed polyurethane block.

The present invention relates more particularly to thermostabilizers stabilizing flame-retardant, phosphorus and halogen-containing addends which are used in the production of foamed polyurethane plastics, the thermostabilizers comprising substituted or unsubstituted aliphatic hydrocarbons having from 4 to 20 carbon atoms and at least one reactive —C—C— double bond in the molecule, the substituents being selected from hydroxylic, carboalkoxy or further neutral groups.

The useful stabilizers also include naturally occurring products having the unsaturated hydrocarbons or their substitution products therein, which products may be partially epoxidized. The useful stabilizers include more particularly the following compounds: oleic acid ethylester, maleic acid dimethylester, dodecene-(1), oleyl alcohol or soy oil. They should conveniently be used in proportions substantially between 0.1 and 30 weight percent, preferably 0.5 and 8 weight percent, based on the quantity of the flameproofing agent. They have more particularly been found to stabilize phosphorus and halogen-containing flameproofing agents in contact with tris-(β-chloroethylphosphate) tris - (2,3 - dibromopropyl) - phosphate, an addition product of tris-(hydroxymethyl)-phosphine oxide with epichlorhydrin and halogenoalkyl or halogenoaryl and hydroxyalkyl-substituted polyethyleneglycol orthophosphoric acid polyesters.

The present invention also relates to a process for stabilizing flame-retardant, phosphorus and halogen-containing addends, which are used in the production of foamed polyurethane plastics, the process comprising adding to a polyurethane batch having the phosphorus and halogen-containing addends therein one or more stabilizers selected from substituted or unsubstituted aliphatic hydrocarbons having from 4 to 20 carbon atoms and at least one reactive —C—C— double bond in the molecule, the substitutents being selected from hydroxylic, carboalkoxy or further neutral groups.

As already mentioned above, the stabilizers which are added to the polyurethane batch may well comprise naturally occurring products having the unsaturated hydrocarbons or their substitution products therein. These naturally occurring products may be partially epoxidized, if desired. The useful stabilizers include, for example, the oleic acid ethylester, maleic acid dimethylester, dodecene-(1), oleyl alcohol or soy oil. They should conveniently be used in proportions substantially between 0.1 and 30 weight percent, preferably between 0.5 and 8 weight percent, based on the weight of the flameproofing agent. It is possible for the stabilizers to be mixed with the polyurethane batch just prior to foaming the polyurethane, or one or more of the individual batch components can be mixed with the stabilizer just prior to making the batch.

The stabilizers of the present invention can be used for stabilizing flame-retardant, phosphorus and halogen-containing addends in the polyurethane batch, the preferred addends being tris-(β-chloroethylphosphate) or tris-(2,3-dibromopropyl)-phosphate, or an addition product of tris-(hydroxymethyl)-phosphine oxide and epichlorohydrin or halogenoalkyl or halogenoaryl and hydroxylalkyl-substituted polyethyleneglycol orthophosphoric acid polyesters.

The halogenoalkyl or halogenoaryl and hydroxyalkyl-substituted polyethyleneglycol orthophosphoric acid polyesters include more particularly such compounds as are described in Belgian Pat. 770,736. The compounds have the following general formula (I):

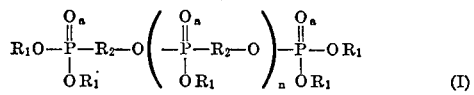

in which $a$ stands for 1 or 0 and 1, $n$ stands for a range between 0 and 4, $R_1$ stands for at least one halogenated hydrocarbon radical and at least one hydroxylated radical of the general formula (II)

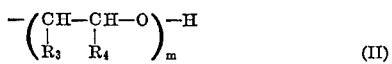

and $R_2$ stands for a radical of the general formula (III)

the $R_3$ and $R_4$ substituents in the above formulae (II) and (III) standing for a hydrogen atom or a hydrocarbon radical having from 1 to 6 carbon atoms, which may be halogen-substituted, and $m$ stands for a member between 1 and 10, preferably between 1 and 4.

$R_1$ may more particularly stand for a mono- or polyhalogenated aliphatic or cycloaliphatic radical, for example a 2-chloroethyl radical or 2,3-dibromopropyl radical, or for a mono- or polyhalogenated aryl radical having at most 8 carbon atoms, and $R_3$ and $R_4$ may more particularly stand for a hydrogen atom or a methyl or chloromethyl radical.

The stabilizers of the present invention were used in the production of polyurethane foam plastics. They could not be found to affect the foaming process, in a manner determinable by testing. The expansion time and the non-tack range, which critically determine the commercial production of foam plastics, could not be found to have been changed. Nor could the stabilizer addends of the present invention be found to affect in a manner determinable by testing the physical properties of the final foam plastics, such as compressive or tear strength, elasticity, dimensional stability, unit weight or the open cellular structure of soft foam plastics. It is known that the mechanical strength values, especially the hardness of foam plastics, can be improved by the use of a stoichiometric excess of di- or polyisocyanate, normally at 2–10 weight percent excess. The stabilizers of the present invention now enable the said excess to be increased to more than 20 weight percent in the absence of any burning or coloration phenomena in the core of the foam plastics.

The following examples illustrate the invention which, however, is not limited thereto.

Caradol 520 is a polyetherpolyol with a hydroxyl number of 520 mg./KOH/g., an acid number of 0.012, a density at 20° C. of 1.10 g./ml. and a viscosity at 20° C. of 6000 cp.

Desmophen 3800 is a polyether on propylene oxide base, which has a molecular weight of 3500, a hydroxyl number of 46, and a density at 20° C. of about 1.0.

U 132 is a silicone oil modified with polyether, having a viscosity of 25° C. of 2500 cst., a refractive index at 25° C. of 1.445–1.450 and a density at 25° C. of 1.05.

U 119 is a water-soluble silicone-polyether-mass copolymer, having a viscosity at 25° C. of 1000–1500 cst., a refractive index at 25° C. of 1.445–1.448 and a density at 25° C. of 1.04.

EXAMPLE 1

A 6 kg. block of a polyurethane foam plastics was made in a container with the dimensions of 60 x 60 x 70 cm., in accordance with the following formulation:

90 parts by weight of a polyetherpolyol with a hydroxyl value of 46 mg. of KOH/g. ("Desmophen 3800," a product of Bayer), 10 parts by weight of a phosphorus and halogen-containing polyol which contained 12.9% of P, 23.8% of Cl and had a hydroxyl value of 95 mg. of KOH/g., 4.2 parts by weight of water, 1.5 parts by weight of a silicon emulsifier ("foam stabilizer U 132," a product of Wacker-Chemie), 0.21 part by weight of tin(II) dioctoate, 0.12 part by weight of bis-(2-dimethylaminoetheyl)ether, 55.6 parts by weight of toluylene diisocyanate, which was a blend of 80% of the 2,4- and 20% of the 2,6-isomers.

All substances were mixed together at room temperature in the sequential order indicated and the mixture was immediately poured into the container. The resulting foam plastics had a unit weight of 25 kg. per cubic meter and was found to be self-extinguishing in the burn off test (ASTM D1692-68T). The foam plastics were found to have a core with a diameter of substantially 35 cm. which was dark brown to yellowish, the coloration fading from the inside towards the outside.

A second block of a foam plastic was made exactly in the manner described above save that a further 0.2 part by weight of oleic acid ethylester was added to the batch. The resulting block equally had a unit weight of 25 kg. per cubic meter and was found to be self-extinguishing in the burn-off test (ASTM 41692-68T). The block of foamed plastic so made was purely white throughout all its parts. The phosphorus and chlorine-containing polyol used as the flameproofing agent was prepared in the following manner.

2950 grams of tris-2-chloroethylphosphate, 294 grams of phosphorus pentoxide and 394 grams of polyphosphoric acid (84 weight percent of $P_2O_5$) were mixed together at room temperature, in a round flask fitted with a stirrer, and the resulting mixture was further blended at 60° C. with 32 grams of $H_3PO_3$ and 10 grams of

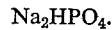

Following heating for 3 hours to 90° C., the mixture so made was reacted between 60 and 80° C. with ethylene oxide. Thhe ethylene oxide was introduced thereinto until the mixture was saturated therewith. Ethylene oxide in excess was expelled by means of nitrogen. 4608 g. of a colorless polyol, which had the above properties, were obtained as the reaction product.

EXAMPLE 2

A 5 kg. block of a polyurethane soft foam plastic was made in a manner analogous to that described in Example 1, in a paperboard container with the dimensions of 50 x 50 x 70 cm.

100 parts by weight of a polyetherpolyol with an OH-value of 42 mg. of KOH/g. (Desmophen 7100, a product of Bayer),
8 parts by weight of tris-(2,3-dibromopropyl)-phosphate,
4 parts by weight of water,
1.2 parts by weight of a silicon emulsifier ("L 520," a product of Union Carbide),
0.22 part by weight of tin(II) dioctoate,
0.1 part by weight of triethylene diamine,
58.3 parts by weight of toluylene diisocyanate, which was a mixture of 80% of 2,4- and 20% of 2,6-isomers.

The foamed block so made was found to have been burnt in the core over an area 20 cm. wide. The center portion of this area was dark and very brittle.

A second foamed block made from the same batch save that 0.5 weight percent of maleic acid dimethylester was added thereto could not be found to have been colored. The two foamed blocks made with and without stabilizer addition had a unit weight of 28 kg. per cubic meter and were self-extinguishing in the burnoff test (ASTM D1692–68T).

EXAMPLE 3

A 10 kg. block of a polyurethane hard foam plastic was made in a large polyethylene bag in accordance with the following formulation:

100 parts by weight of a polyetherpolyl with the hydroxyl value of 520 mg. of KOH/g. ("Caradol 520," a product of Shell-Chemie),
25 parts by weight of tris-($\beta$-chloroethyl)-phosphate,
3 parts by weight of triethylamine,
1 part by weight of water,
1 part by weight of a silicon emulsifier (foam stabilizer U 119, a product of Wacker-Chemie),
24 parts by weight of trichlorofluoromethane, and
150 parts by weight of methylenediphenyl-4,4'-diisocyanate.

The core of the foamed product was found to have been colored medium brown tints covering an area up to substantially 45 cm. in diameter. The coloration faded from the inside towards the outside. The same batch save that it had 4 parts by weight of a partially epoxidized soy oil therein produced a foam plastics which was uniformly colored slightly beige tints.

The two foam plastics both had a unit weight of 37 kg. per cubic meter and were self-extinguishing in the burn-off test (ASTM D1692–68T).

EXAMPLE 4

A 10 kg. block of a polyurethane hard foam plastics was prepared in a manner analogous to that described in Example 1 from the following starting materials and foamed in a polyethylene bag.

75 parts by weight of a polyetherpolyol with an OH-value of 520 mg. of KOH/g. ("Caradol 520," a product of Shell-Chemie),
25 parts by weight of a phosphorus and chlorine-containing polyol, which contained 11.1 weight percent of P, 15.9 weight percent of Cl and had an OH-value of 220 mg. of KOH/g.,
3 parts by weight of triethylamine,
1 part by weight of water,
1 part by weight of a silicon emulsifier (foam stabilizer U 119, a product of Wacker-Chemie),
24 parts by weight of trichlorofluoromethane,
130 parts by weight of methylenediphenyl-4,4'-diisocyanate.

The resulting foam plastic had a unit weight of 35 kg. per cubic meter and was self-extinguishing in the burn-off test (ASTM D1692–68T). The core of the foam plastics was colored brown to violet tints and showed crack formation.

The same batch save that it had 3 parts by weight of dodecene-(1) therein produced a foamed plastics which was uniformly colored bright beige tints and self-extinguishing.

The phosphorus and chlorine-containing polyol used as the flameproofing agent was prepared as follows:

1863 grams of tris-2-chloroethylphosphate, 737 grams of polyphosphoric acid (84 weight percent of $P_2O_5$), 26 grams of $H_3PO_3$ and 8 grams of $Na_2HPO$ were mixed together in a round flask fitted with a stirrer and the resulting mixture was heated for 1 hour to 150° C. Following this, ethylene oxide was introduced at 80° C. into the mixture until it was saturated therewith. Ethylene oxide in excess was expelled by means of nitrogen. 4426 grams of a slightly yellowish polyol, which had the above properties, were obtained.

EXAMPLE 5

A 10 kg. block of a polyurethane hard foam plastic was prepared in accordance with the following formulation and formed in a polyethylene bag.

75 parts by weight of a polyetherpolyol with an OH-value of 520 mg. of KOH/g. ("Caradol 520," a product of Shell-Chemie),
25 parts by weight of a phosphorus and chlorine-containing polyol, which contained 25 weight percent of Cl, 7.4 weight percent of P and and had an OH-value of 420 mg. of KOH/g., and which was prepared from tris-(hydroxymethyl)-phosphine oxide and epichlorhydrin in the manner described in German Pat. 1,208,485,
3 parts by weight of triethylamine,
1.0 part by weight of water,
1.0 part by weight of a silicon emulsifier (foam stabilizer U 119, a product of Wacker-Chemie),
18 parts by weight of trichlorofluormethane,
140 parts by weight of methylenediphenyl-4,4'-diisocyanate.

The resulting product had a unit weight of 50 kg. per cubic meter, was self-extinguishing in the burn-off test (ASTM D1692–68T) and colored brown tints in the core.

The same batch save that it had 1.5 parts by weight of oleyl alcohol therein gave an identical product save that it was uniformly colored bright beige tints.

What is claimed is:

1. A process for stabilizing flame-proofing agent containing phosphorus and halogen in the production of polyurethane foam plastics, which comprises adding to a polyurethane foam forming reaction mixture having said flame-proofing agent therein at least one stabilizer selected from the group consisting of oleic acid ethylester, maleic acid dimethylester, dodecene-(1), oleyl alcohol and soy oil.

2. The process as claimed in claim 1, wherein the stabilizer is added to the polyurethane foam forming reaction mixture in a proportion substantially between 0.1 and 30 weight percent, based on the weight of the flame-proofing agent.

3. The process as claimed in claim 2, wherein the stabilizer is added to the polyurethane foam forming reaction mixture in a proportion between 0.5 and 8 weight percent, based on the weight of the flame-proofing agent.

4. The process as claimed in claim 1, wherein the stabilizer is admixed with the polyurethane foam forming reaction mixture just prior to foaming, or at least one of the individual batch components is mixed with the stabilizer.

5. The process as claimed in claim 1, wherein tris-($\beta$-chloroethylphosphate), tris-(2,3-dibromopropyl) - phosphate, an addition product of tris-(hydroxymethyl)-phosphate oxide and epichlorhydrin or halogenoalkyl or halogenoaryl and hydroxyalkyl-substituted polyethyleneglycol orthophosphoric acid polyesters are the flame-retardant phosphorus and halogen-containing addends in the polyurethane foam forming reaction mixture.

References Cited

UNITED STATES PATENTS 3,579,471  5/1971  Dijkhuizen _____ 260—2.5 AG

FOREIGN PATENTS 1,086,736  10/1967  Great Britain _____ 260—2.5 AJ

OTHER REFERENCES

Lyon et al.: "Castor Oil-Based, Flame Resistant Rigid Urethane Foams," Journal of Cellular Plastics, vol. 3, No. 2, February 1967, pp. 91–95.

DONALD E. CZAJA, Primary Examiner

C. W. IVY, Assistant Examiner

U.S. Cl. X.R.

260—2.5 AJ, 2.5 AR, 606.5 P, 989